US010008216B2

(12) United States Patent
Yassa et al.

(10) Patent No.: US 10,008,216 B2
(45) Date of Patent: Jun. 26, 2018

(54) METHOD AND APPARATUS FOR EXEMPLARY MORPHING COMPUTER SYSTEM BACKGROUND

(71) Applicant: SPEECH MORPHING SYSTEMS, INC., San Jose, CA (US)

(72) Inventors: Fathy Yassa, Soquel, CA (US); Benjamin Reaves, Menlo Park, CA (US); Steve Pearson, Felton, CA (US)

(73) Assignee: SPEECH MORPHING SYSTEMS, INC., San Jose, CA (US)

( * ) Notice: Subject to any disclaimer, the term of this patent is extended or adjusted under 35 U.S.C. 154(b) by 0 days. days.

(21) Appl. No.: 14/253,853

(22) Filed: Apr. 15, 2014

(65) Prior Publication Data

US 2017/0249953 A1 Aug. 31, 2017

(51) Int. Cl.
*G10L 25/51* (2013.01)
*G10L 21/013* (2013.01)
*G10L 15/02* (2006.01)
*G10L 25/90* (2013.01)

(52) U.S. Cl.
CPC ............ *G10L 21/013* (2013.01); *G10L 15/02* (2013.01); *G10L 25/51* (2013.01); *G10L 25/90* (2013.01); *G10L 2015/022* (2013.01); *G10L 2015/025* (2013.01); *G10L 2021/0135* (2013.01)

(58) Field of Classification Search
CPC ...... G10L 13/00; G10L 15/187; G10L 15/063
See application file for complete search history.

(56) References Cited

U.S. PATENT DOCUMENTS

| | | | | |
|---|---|---|---|---|
| 3,575,555 | A * | 4/1971 | Schanne | G10L 13/08 704/267 |
| 5,384,893 | A * | 1/1995 | Hutchins | G10L 13/08 704/258 |
| 6,366,883 | B1 * | 4/2002 | Campbell | G10L 13/07 704/258 |
| 6,438,522 | B1 * | 8/2002 | Minowa | G10L 13/08 704/258 |
| 6,829,577 | B1 * | 12/2004 | Gleason | G10L 13/04 704/207 |
| 9,311,912 | B1 * | 4/2016 | Swietlinski | G10L 13/04 |
| 2007/0185715 | A1 * | 8/2007 | Wei | G10L 15/07 704/254 |
| 2009/0326951 | A1 * | 12/2009 | Morinaka | G10L 13/06 704/268 |
| 2010/0161327 | A1 * | 6/2010 | Chandra | G10L 13/06 704/235 |
| 2010/0268539 | A1 * | 10/2010 | Xu | G10L 13/04 704/260 |
| 2013/0262096 | A1 * | 10/2013 | Wilhelms-Tricarico | G10L 25/90 704/202 |
| 2017/0162188 | A1 * | 6/2017 | Yassa | G10L 13/07 |

FOREIGN PATENT DOCUMENTS

KR 20150087023 A * 7/2015 ............. G10L 13/10

* cited by examiner

*Primary Examiner* — Pierre-Louis Desir
*Assistant Examiner* — Yi-Sheng Wang
(74) *Attorney, Agent, or Firm* — Sughrue Mion, PLLC

(57) ABSTRACT

Method and apparatus for reducing a size of databases required for recorded speech data.

34 Claims, 8 Drawing Sheets

METHOD AND APPARATUS FOR
EXEMPLARY MORPHING COMPUTER
SYSTEM BACKGROUND

BACKGROUND

Voice Morphing which is also referred to as voice transformation and voice conversion is a technique to modify a source speaker's speech utterance to sound as if it was spoken by a target speaker. There are many applications which may benefit from this sort of technology. For example, a TTS system with voice morphing technology integrated can produce many different voices. In cases where the speaker identity plays a key role, such as dubbing movies and TV-shows, the availability of high quality voice morphing technology will be very valuable allowing the appropriate voice to be generated (maybe in different languages) without the original actors being present.

There are basically three inter-dependent issues that must be solved before building a voice morphing system. Firstly, it is important to develop a mathematical model to represent the speech signal so that the synthetic speech can be regenerated and prosody can be manipulated without artifacts. Secondly, the various acoustic cues which enable humans to identify speakers must be identified and extracted. Thirdly, the type of conversion function and the method of training and applying the conversion function must be decided.

This disclosure is concerned with the first issue, to wit, the mathematical model to represent the speech signal, and in particularly, missing speech units in the target voice. One of the problems which presents itself in voice morphing is that the TTS may have an incomplete set of phonemes and diphones corresponding to the target speaker's voice. The set may be incomplete for any number of reasons, including the amount of target speaker time and information that is required to generate a complete set.

One solution which has been implemented in numerous applications is known as unit selection. Synthesized speech can be created by concatenating pieces of recorded speech that are stored in a database. Systems differ in the size of the stored speech units; a system that stores phones or diphones provides the largest output range, but may lack clarity.

Unit selection synthesis uses large databases of recorded speech. During database creation, each recorded utterance is segmented into some or all of the following: individual phones, diphones, half-phones, syllables, morphemes, words, phrases, and sentences. Typically, the division into segments is done using a specially modified speech recognizer set to a "forced alignment" mode with some manual correction afterward, using visual representations such as the waveform and spectrogram an index of the units in the speech database is then created based on the segmentation and acoustic parameters like the fundamental frequency (pitch), duration, position in the syllable, and neighboring phones. At run time, the desired target utterance is created by determining the best chain of candidate units from the database (unit selection). This process is typically achieved using a specially weighted decision tree.

Unit selection provides the greatest naturalness, because it applies only a small amount of digital signal processing (DSP) to the recorded speech. DSP often makes recorded speech sound less natural, although some systems use a small amount of signal processing at the point of concatenation to smooth the waveform. The output from the best unit-selection systems is often indistinguishable from real human voices, especially in contexts for which the TTS system has been tuned. However, maximum naturalness typically require unit-selection speech databases to be very large, in some systems ranging into the gigabytes of recorded data, representing dozens of hours of speech. Also, unit selection algorithms have been known to select segments from a place that results in less than ideal synthesis (e.g. minor words become unclear) even when a better choice exists in the database.

Should the target elect to record less than the requisite amount of data there will be missing units in the target speech's voice database, resulting in an incomplete or unnatural output.

The computer system herein describes admits an exemplary method and apparatus for reducing the size of the required databases of recorded data and therefore the amount of time the target must spend recording speech.

STATE OF THE ART

In sound processing, the State of the art is the mel-frequency cepstrum (MFC) is a representation of the short-term power spectrum of a sound, based on a linear cosine transform of a log power spectrum on a nonlinear mel scale of frequency.

Mel-frequency cepstral coefficients (MFCCs) are coefficients that collectively make up an MFC. They are derived from a type of cepstral representation of the audio clip (a nonlinear "spectrum-of-a-spectrum"). The difference between the cepstrum and the mel-frequency cepstrum is that in the MFC, the frequency bands are equally spaced on the mel scale, which approximates the human auditory system's response more closely than the linearly-spaced frequency bands used in the normal cepstrum. This frequency warping can allow for better representation of sound, for example, in audio compression.

SUMMARY OF THE INVENTION

This invention admits an exemplary method and apparatus for converting either the spoken word or written text into output speech of desired target's voice.

DETAILED DESCRIPTION OF THE EMBODIMENTS

Figure 1:
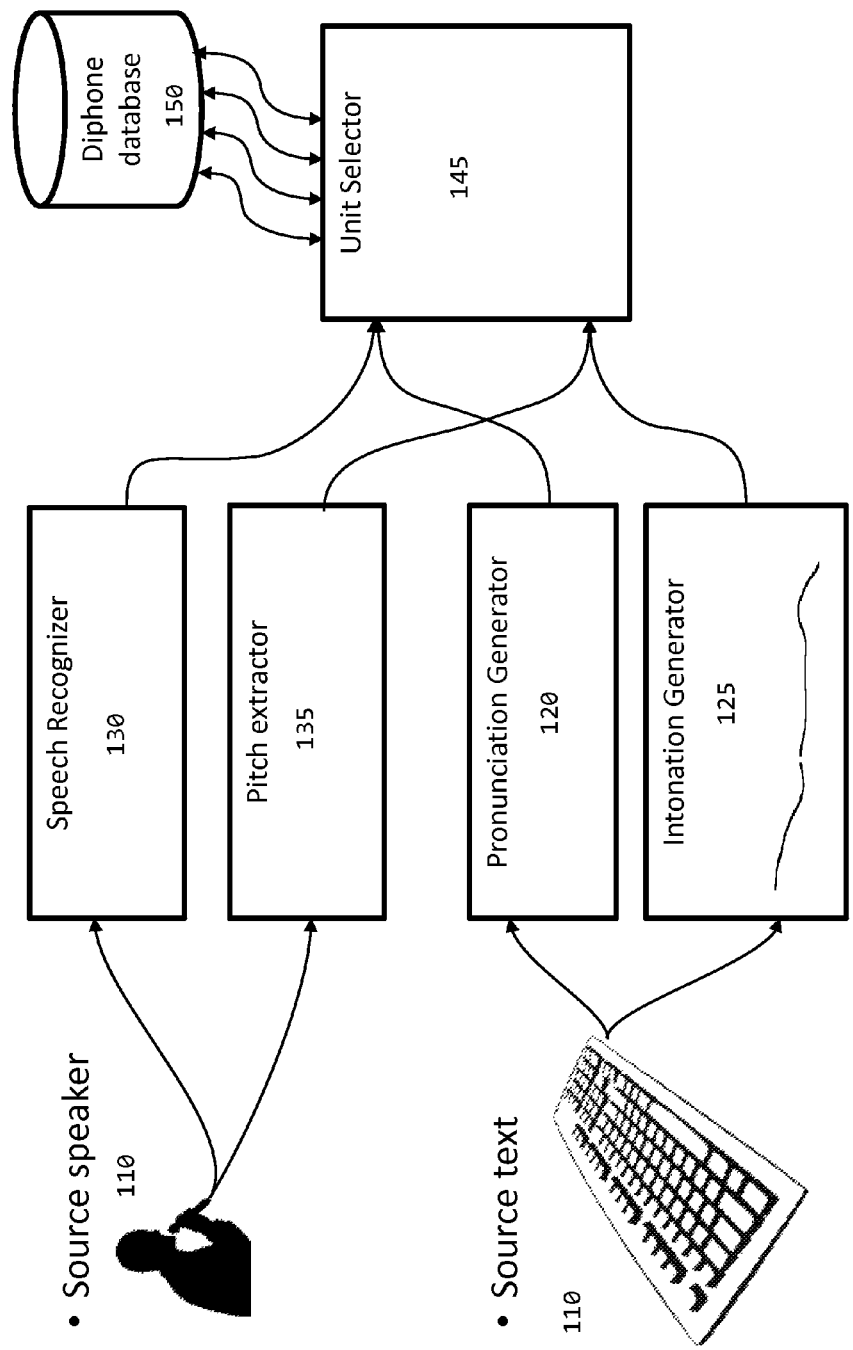
FIG. 1 illustrates a system level overview of the computer system

FIG. 1 illustrates a system level overview of one embodiment of the exemplary computer system configured to convert audio or written speech into output audio of a desired voice. In one embodiment of the invention, Source 110 is a audible speech. ASR 130 creates a phoneme list from Source 110's speech and Pitch Extractor 135 extracts the pitch from Source 110's speech.

In another embodiment of the invention, Source 110 is typed words along with phonetic information. Phonetic Generator 120 converts the written text into the phonetic alphabet. Intonation Generator 125 generates the pitch from the typed text.

In both embodiments of the invention, Unit Selector 145 compares the generated diphones of Source 110 with the candidate diphones of Diphone Database 150 to select and output the best match.

Figure 2:
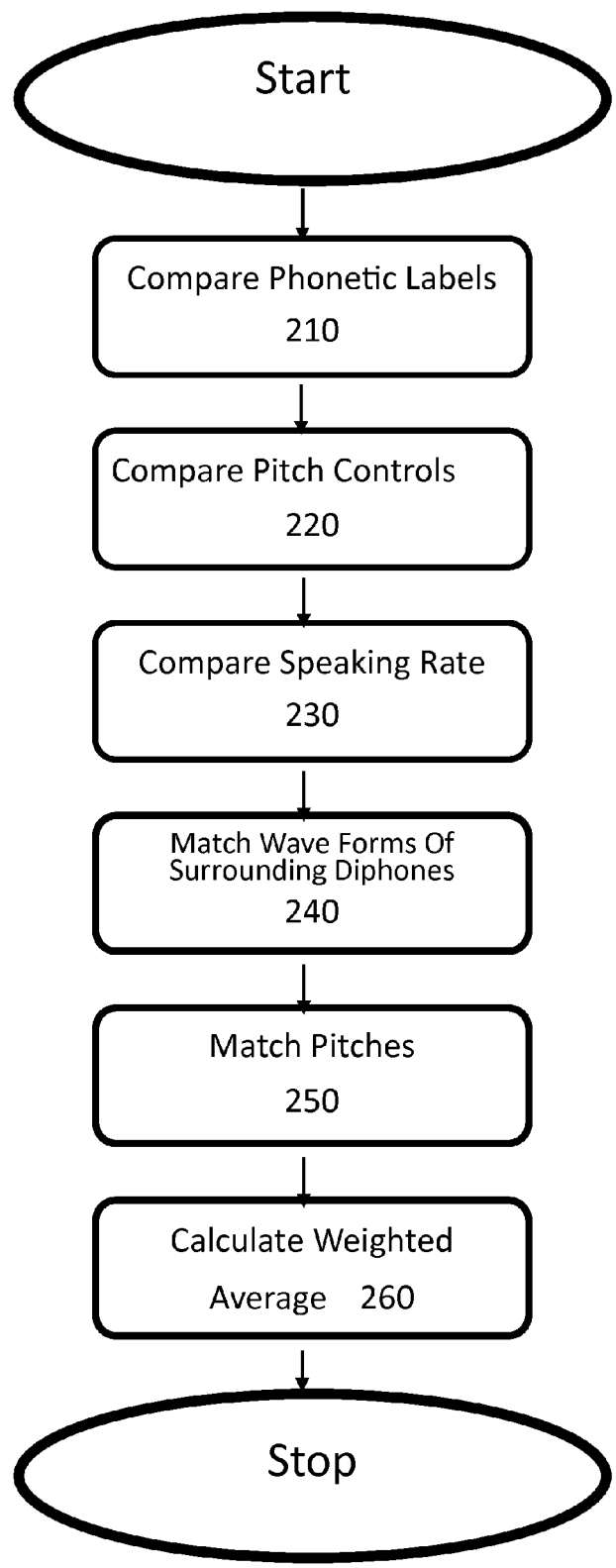
FIG. 2 illustrates a flow diagram of one embodiment of the invention.

FIG. 2 illustrates a flow diagram of one embodiment of the computer system selecting the best match for the subject diphone. At step 210 the computer system compares the phonetic transcription, i.e. the label, of the subject diphone from the original speech to the phonetic transcription of each potential diphone match in the diphone database and determines the quality of the match, i.e. the label match lm. As step 220, the computer system compares the pitch contour (pc) of the subject unit with each of the potential matches to determine how close they are to each other. This difference is delta_pc.

At step 230 the computer system compares the speaking rate (sr), aka duration, of the phone, to the speaking rates of each of the potential diphone matches. This difference is delta_sr.

At step 240, the computer system considers the first three formants (fm1, fm2, fm3) of the diphones which surround both the subject diphone as well as each of the potential matches. Specifically, the computer system matches the first 3 formants, i.e. delta_fm1, delta fm2, delta_fm3.

At step 250, the computer system matches the pitches (p) of the subject diphone with the potential target diphones. The difference between the pitch is delta_p.

Figure 3:
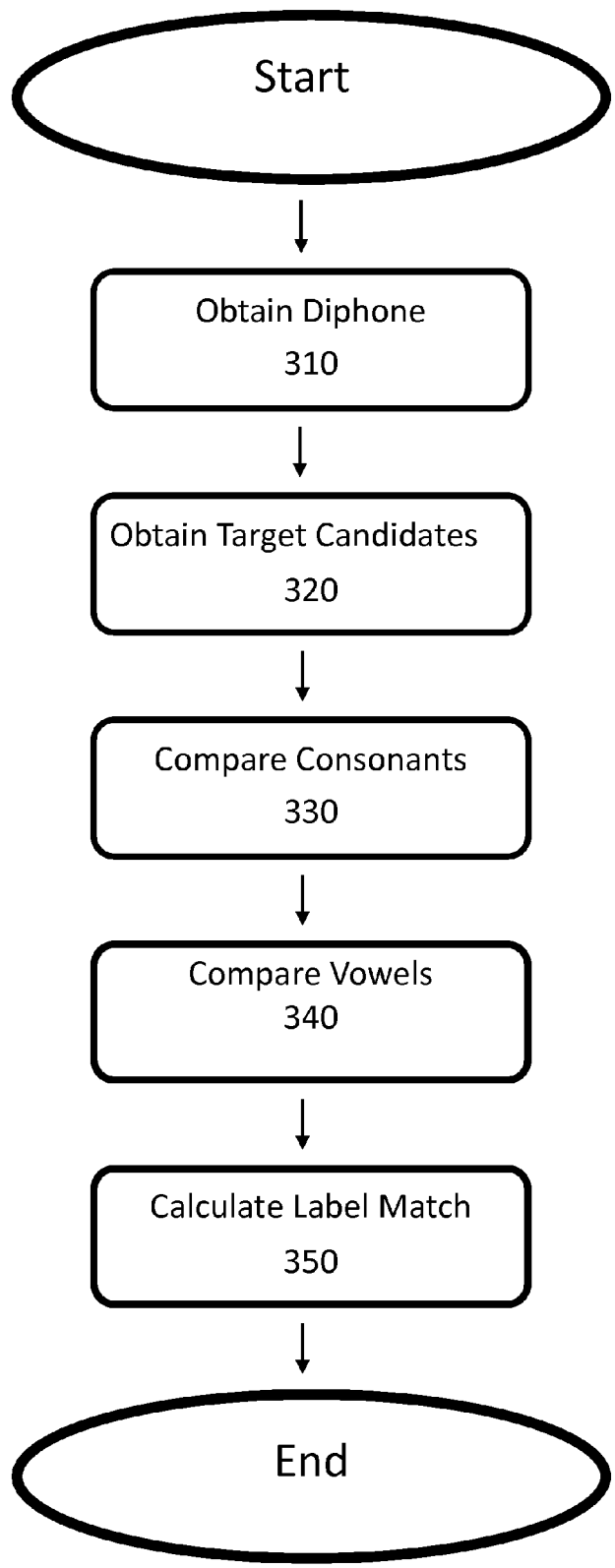
FIG. 3 illustrates a flow diagram of one embodiment of the invention.

At step 260 the computer system does a weighted average of the quality of the match for each of the five characteristics FIG. 3 illustrates a flow diagram of the process of label matching between Source 101's diphones and the target speakers diphones located in Diphone Database 140.

At step 310, Unit Selector 145 obtains a diphone from either Phonetic Generator 120 or ASR 130. Unit Selector 145 obtains a list of candidate matches to the target speaker's voice from Diphone Database 140 at step 320. Generating this list of candidate matches is well known to someone skilled in the art of speech morphology.

At Step 330 Unit Selector 145 compares the consonant portions of the original subject diphone with the consonant portion or each potential diphone match. Step 330 assigns one of three weighting number to represent the consonant difference cd; "0", which means the consonant portions are identical, i.e. there is no phonetic difference between the consonants; "1", which means the consonant portions are distinct, but in the same phoneme class and "3" or higher, which means the consonant portions are distinct and in different phoneme classes.

Similarly, at step 340, Unit Selector 145 compares the vowel portions of both Source 101's diphone with the vowel portion or each potential diphone candidate match. Similar to Step 330, Step 340 assigns one of three weighting number to represent the vowel difference vd; "0", which means the vowel portions are identical, i.e. there is no phonetic difference between the vowel, "½", which means the vowel portions are distinct, but in the same phoneme class and "1½", which means the consonant portions are distinct and in different phoneme classes. Since vowels are easier to morph than consonants, they are given less weight.

At step 350, Unit Selector 145 computes the quality of the label matches (lm) between Source 101's diphone and each of potential diphone candidate matches from Diphone Database 140. The label match weighting factor lm equals the sum of the consonant distance cd and the vowel distance vd.

$$lm = cd + vd \quad \#\#\#\#EQ001\#\#\#$$

At step 360, lm is normalized. In the specific embodiment, the normalization factor is 150, to ensure that lm is in the single digits.

Figure 4:
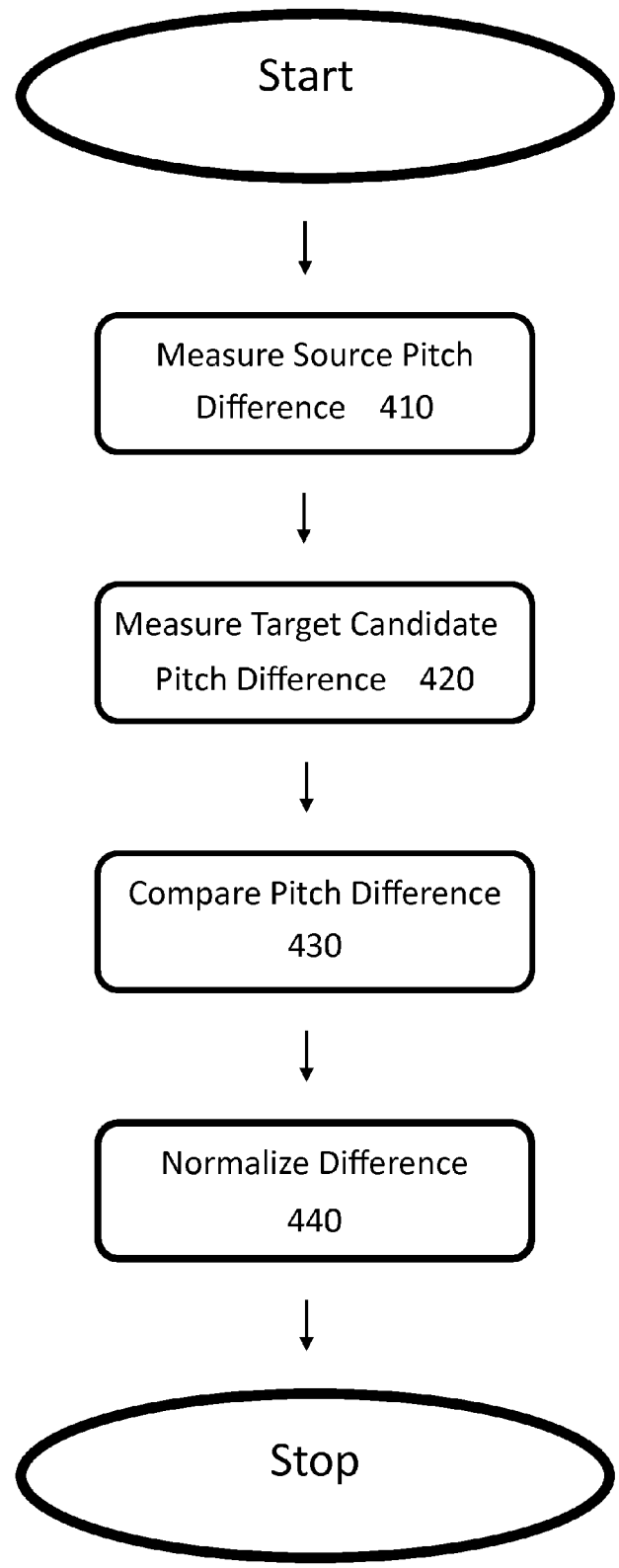
FIG. 4 illustrates a flow diagram of one embodiment of the invention.

FIG. 4 illustrates a flow diagram of Unit Selector 145 comparing the pitch contour pc of Source 101's subject diphone with the pitch contours of each of the potential target diphones from Diphone Database 140.

At step 410, Unit Selector 145 measures the pitch at the beginning and end of the source speaker's diphone and obtains the difference, i.e. the delta_pitch_source. At step 420, Unit Selector 145 measures the pitch at the beginning and end of each of the potential target diphones and obtains the difference for each diphone, i.e. delta_pitch_target.

At step 430, Unit Selector 145 computes the difference between the delta pitch of Source 101's diphone to the delta pitch of each of the target to obtain the delta pitch contour between the source speaker's diphone and each of the potential diphone matches for the target speaker.

$$delta\_pitch = delta\_pitch\_target - delta\_pitch\_source \quad \#\#\#\#EQ0002\#\#\#\#$$

At step 440, the difference is normalized to be on the same order as the label match weighting factor, i.e. between "0" and "1". In the current embodiment the normalization factor is 50.

Figure 5:
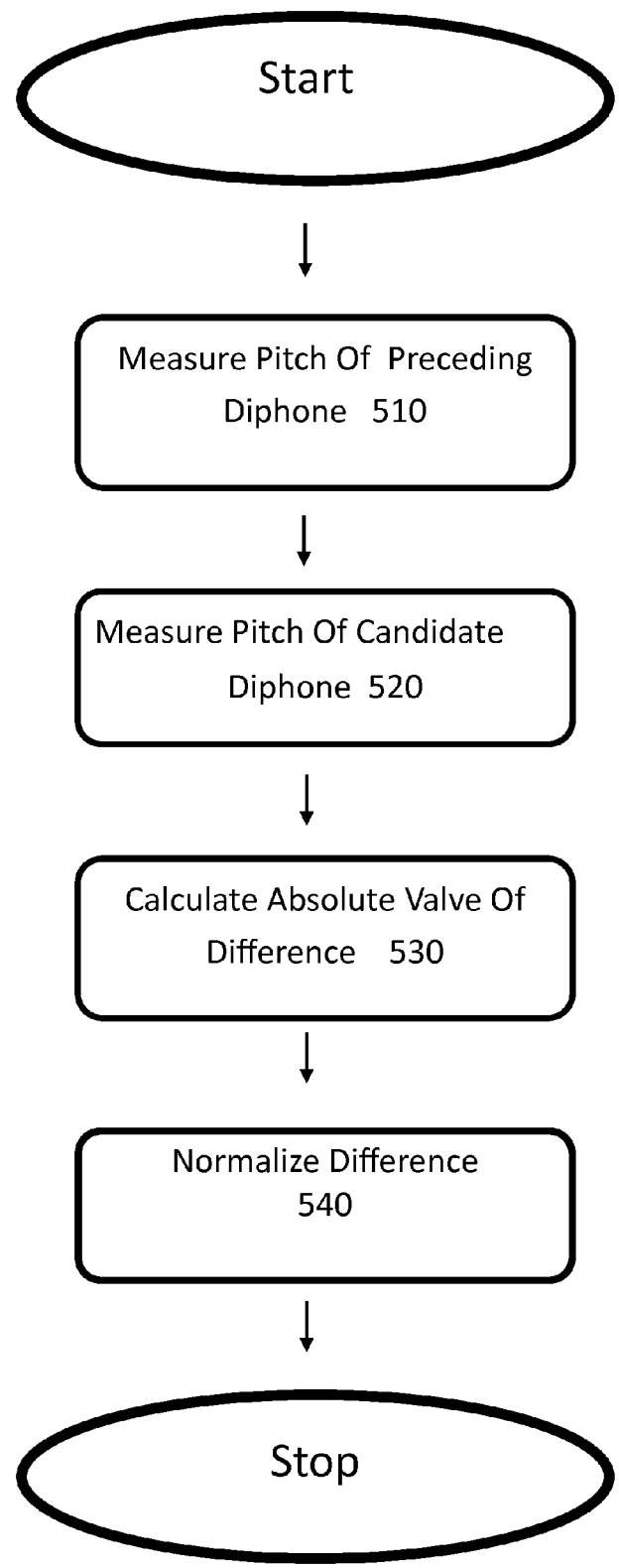
FIG. 5 illustrates a flow diagram of one embodiment of the invention.

FIG. 5 illustrates a flow diagram of Unit Selector 145 matching the pitches between the source speaker's diphone and each of the potential diphones of the target speaker.

At step 510, Unit Selector 145 measures the pitch of the end of the preceding diphone in the output speech. At step 520, Unit Selector 145 measures the pitch of each potential diphone match.

At step 530, Unit Selector 140 determines the absolute value of the difference between the pitch at the end of the preceding diphone in the output speech and the pitch at the beginning of each of the potential output diphones. At step 540, the difference is normalized to be on the same order as the label match weighting factor lm and the pitch contour weighting factor pc. In the specific embodiment the normalization factor is 150.

Figure 6:
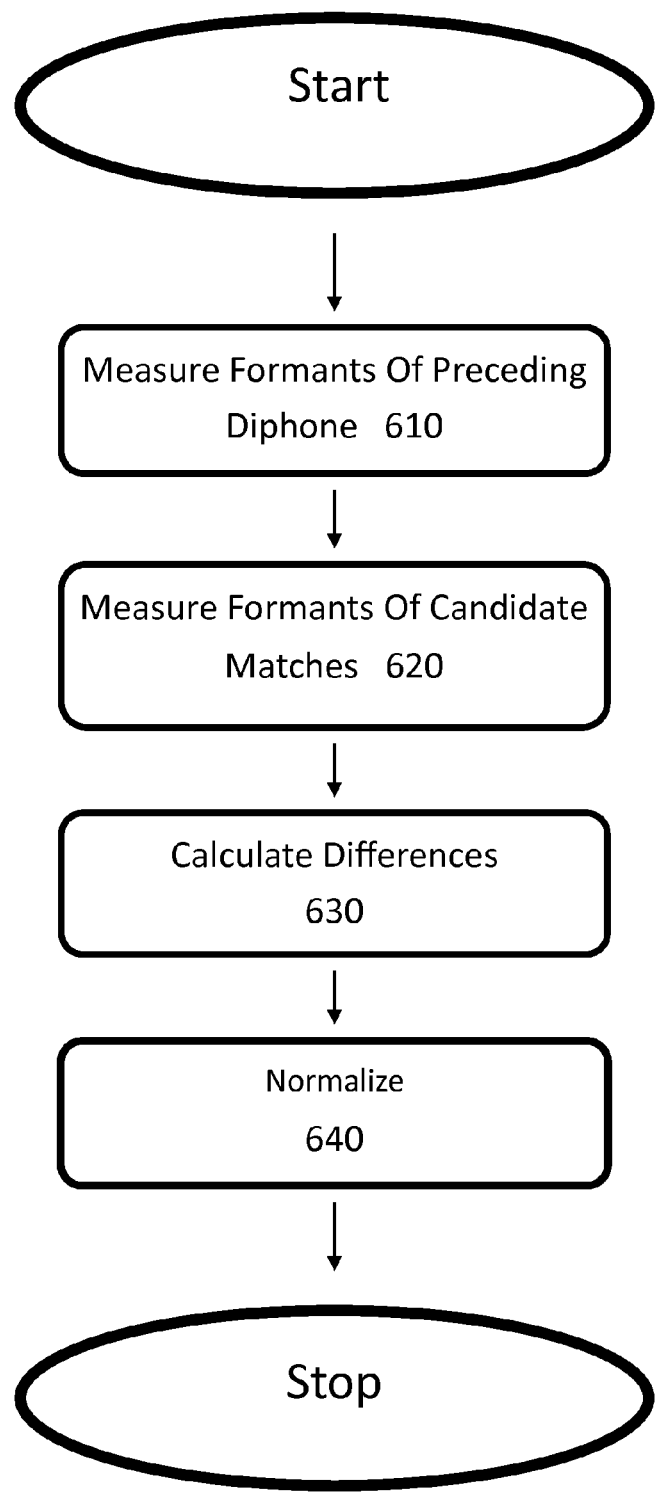
FIG. 6 illustrates a flow diagram of one embodiment of the invention.
Figure 7:
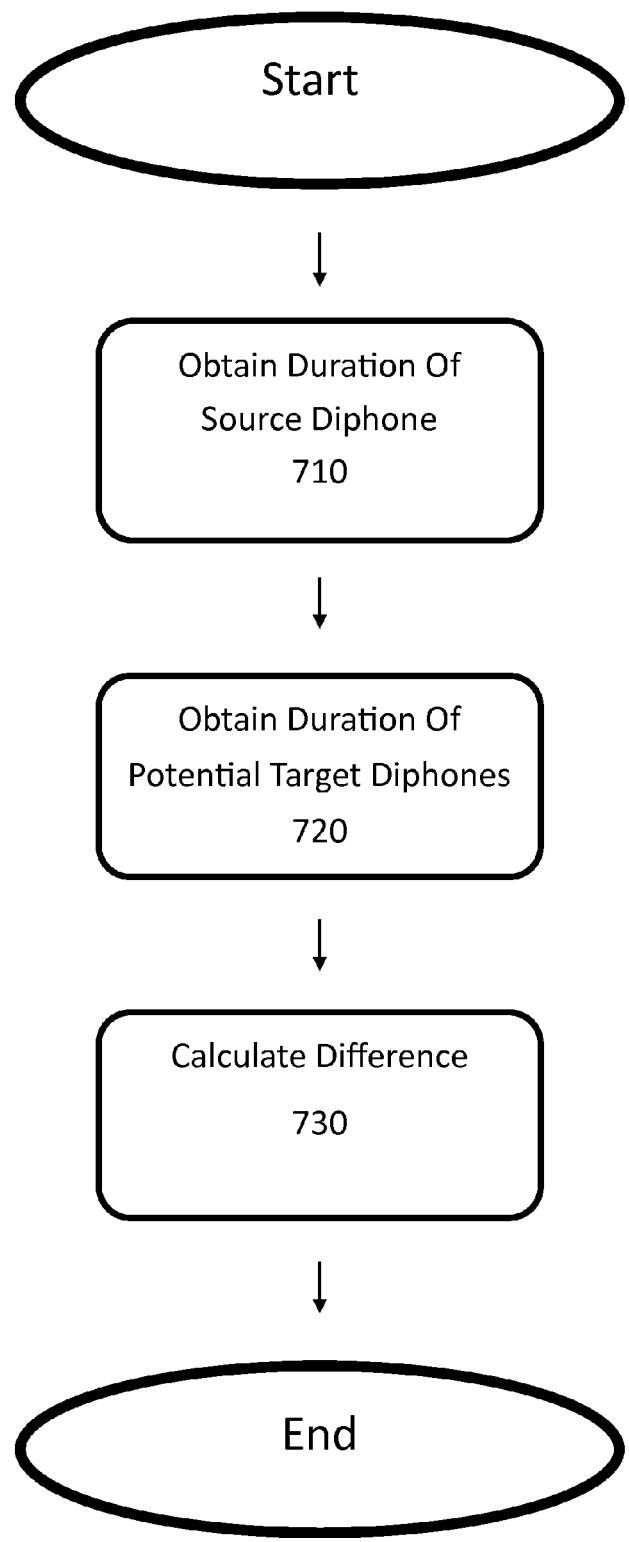
FIG. 7 illustrates a flow diagram of one embodiment of the invention.

FIG. 6 illustrates a flow diagram of Unit Selector 145 matching the first three formants between the source speaker's diphone with the first three formants of each of potential diphones candidates of the target speaker.

At step 610, Unit Selector 145 measures the first three formants of the end of the preceding diphone in the output speech. At step 620, Unit Selector 145 measures the first three formants of each potential diphone match.

At step 630, Unit Selector 145 determines the difference between each of the first three formants at the end of the preceding diphone in the output speech and the first three formants at the beginning of each of the potential output diphones, i.e. delta_fm. At step 640, this difference is normalized.

At step 710 Unit Selector 145 obtains measure the durations of both the diphone from Source 101 and the candidate target diphones at step 720. At step 730 Unit Selector 145 calculates the difference between the durations.

Figure 8:
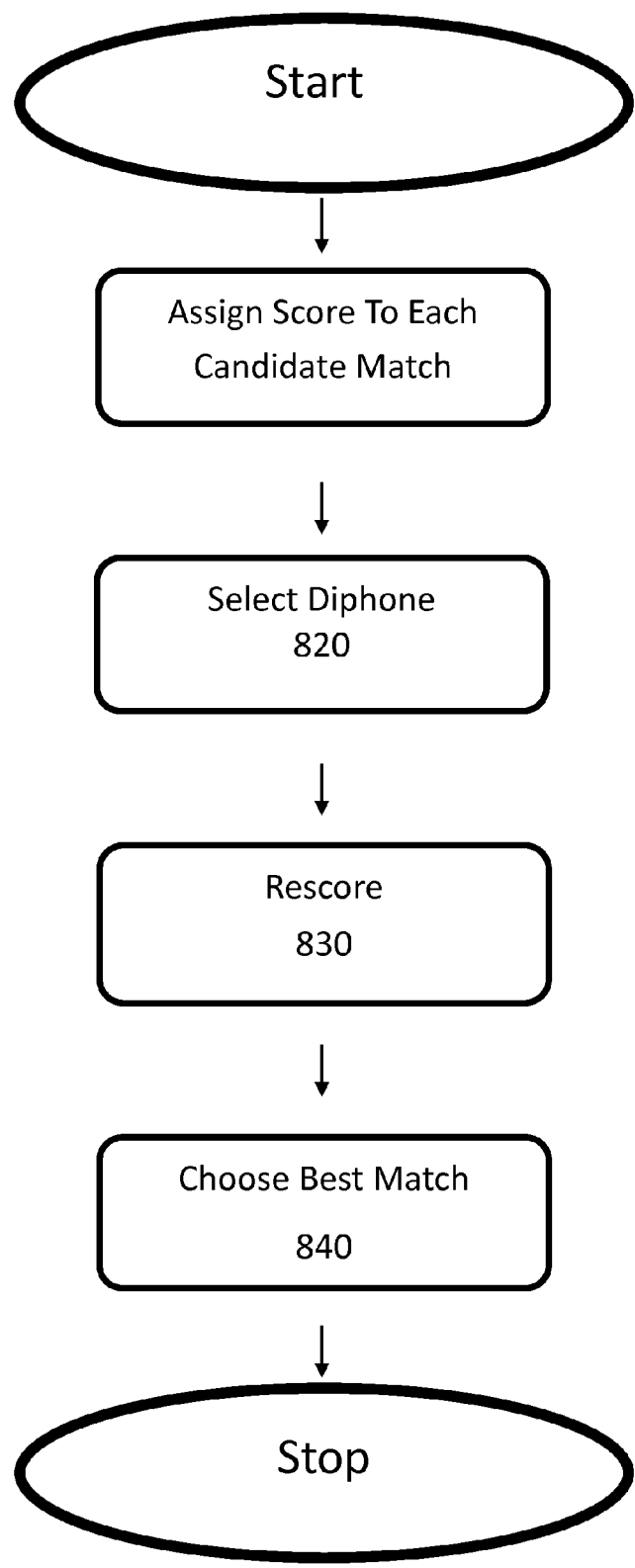
FIG. 8 illustrates a flow diagram of one embodiment of the invention.

FIG. 8 illustrates a flow diagram of determining which of the potential matches of Diphone Database 140 the best match. At step 810, Unit Selector 145 assigns a score to each of the potential diphone candidate matches which correspond to the quality of the match with the subject diphone; i.e. the lower the score the better the match. The score is calculated as follows $$\text{Score} = (\text{delta\_}pc*0.3) + (\text{delta\_pitch}*0.1) + (lm*0.5) + (\text{delta\_}fm*0.1) + (\text{delta\_}sr*0.2)$$

At step 820, Unit Selector 145 selects the target diphone that has the lowest score. This is repeated for each diphone in from Source 110 until a string of the best Diphones has been selected.

At step 830, Unit Selector does a backward match to rescore and determine if better matches can be found. The mechanics of a backwards match are known to one versed in the art of speech morphology.

We claim:

1. A system for morphing diphones of a source voice of a source speaker into a target voice of a target speaker, the system comprising:
    a database storing a plurality of diphones;
    an automated speech recognizer (ASR) configured to create a list of phonemes from the source voice of the source speaker;
    a pitch extractor configured to extract the pitch from the source speech of the source speaker, wherein the ASR and the pitch extractor are configured to convert the source voice of the source speaker into a sequence of diphones based on the list of phonemes and the pitch; and
    a unit selector configured to select, for each of diphones in the sequence of diphones, a best matching diphone from among candidate diphones in the database based on:
        a quality of a label match between a phonetic transcription of the diphone to phonetic transcriptions of the candidate diphones determined based on a summation of consonant distances between the diphone and the candidate diphones and vowel distances between the diphone and the candidate diphones,
        differences between a pitch contour of the diphone to pitch contours of the candidate diphones,
        differences between a duration of the diphone and durations of the candidate diphones,
        differences between a plurality of formants of a preceding diphone that precedes the diphone and corresponding pluralities of formants of the candidate diphones, and
        differences between a pitch of the diphone and pitches of the candidate diphones.

2. The system of claim 1, wherein the speech recognizer is configured to obtain an audio waveform from the source voice of the source speaker and convert the audio waveform into the sequence of phonemes.

3. The system of claim 1, wherein the pitch extractor is configured to determine a pitch contour of each diphone of the source voice of the source speaker.

4. The system of claim 1, wherein the unit selector is configured to obtain a list of the candidate diphones from the database.

5. The system of claim 1, wherein the unit selector is configured to determine the quality of the label match by comparing consonant portions of the diphone with consonant portions of the candidate diphones, determining consonant distances between the consonant portions of the diphone and the consonant portions of the candidate diphones, assigning weights to the consonant distances, comparing vowel portions of the diphone and vowel portions of the candidate diphones, determining vowel distances between the vowel portions of the diphone and vowel portions of the candidate diphones, and assigning weights to the vowel distances.

6. The system of claim 1, wherein the unit selector is configured to determine the differences between the pitch contour of the diphone to pitch contours of the candidate diphones by calculating a first difference between a pitch at a beginning of the diphone and a pitch at an end of the diphone, calculating second differences between pitches at beginnings of the candidate diphones and pitches at ends of the candidate diphones, and comparing the first difference with the second differences to obtain a pitch contour between the diphone and the candidate diphones.

7. The system of claim 1, wherein the unit selector is configured to compare the differences between the duration of the diphone and the durations of the candidate diphones.

8. The system of claim 1, wherein the unit selector is configured to determine the differences between the plurality of formants of the preceding diphone that precedes the diphone and the corresponding pluralities of formants of the candidate diphones by normalizing the differences between the plurality of formants of the preceding diphone that precedes the diphone and the corresponding pluralities of formants of the candidate diphones.

9. The system of claim 8, wherein the plurality of formants comprises three formants of the at an end of the preceding diphone and the corresponding plurality of formants of the candidate diphones comprises a first three formants at beginnings of each of the candidate diphones.

10. The system of claim 1, wherein the unit selector is configure to determine the differences between the pitch of the diphone and the pitches of the candidate diphones by calculating differences between the pitch of the diphone at an end of the diphone and the pitches of the candidate diphones at beginnings of each of the candidate diphones.

11. The system of claim 1, wherein the unit selector is configured to compute weighted averages of the quality of the label match between the phonetic transcription of the diphone to the phonetic transcriptions of the candidate diphones, the differences between the pitch contour of the diphone to the pitch contours of the candidate diphones, the differences between the duration of the diphone and the durations of the candidate diphones, the differences between the plurality of formants of the preceding diphone that precedes the diphone and the corresponding pluralities of formants of the candidate diphones, and the differences between the pitch of the diphone and the pitches of the candidate diphones for each of the candidate diphones, and determine the best matching diphone based on the weighted averages.

12. The system of claim 11, wherein a weight of the quality of the label match between the phonetic transcription of the diphone to the phonetic transcriptions of the candidate diphones is 42%.

13. The system of claim 11, wherein a weight of the differences between the pitch contour of the diphone to the pitch contours of the candidate diphones is 25%.

14. The system of claim 11, wherein a weight of the differences between the pitch of the diphone and the pitches of the candidate diphones is 8%.

15. The system of claim 11, wherein a weight of the differences between the duration of the diphone and the durations of the candidate diphones is 17%.

16. The system of claim 11, wherein a weight of the differences between the plurality of formants of the preceding diphone that precedes the diphone and the corresponding pluralities of formants of the candidate diphones is 8%.

17. The system of claim 1, wherein the unit selector generates a string of best matching diphones for the sequence of diphones.

18. A method of morphing diphones of a source voice of a source speaker into a target voice of a target speaker, the method comprising:
    storing a plurality of diphones in a database;
    creating, by an automated speech recognizer (ASR), a list of phonemes from the source voice of the source speaker;
    extracting, by a pitch extractor, the pitch from the source speech of the source speaker;
    converting the source voice of the source speaker into a sequence of diphones based on the list of phonemes and the pitch; and
    selecting, for each of diphones in the sequence of diphones, a best matching diphone from among candidate diphones in the database based on:
        a quality of a label match between a phonetic transcription of the diphone to phonetic transcriptions of the candidate diphones determined based on a summation of consonant distances between the diphone and the candidate diphones and vowel distances between the diphone and the candidate diphones,
        differences between a pitch contour of the diphone to pitch contours of the candidate diphones,
        differences between a duration of the diphone and durations of the candidate diphones,
        differences between a plurality of formants of a preceding diphone that precedes the diphone and corresponding pluralities of formants of the candidate diphones, and
        differences between a pitch of the diphone and pitches of the candidate diphones.

19. The method of claim 18, wherein the speech recognizer is configured to obtain an audio waveform from the source voice of the source speaker and convert the audio waveform into the sequence of phonemes.

20. The method of claim 18, wherein the pitch extractor is configured to determine a pitch contour of each diphone of the source voice of the source speaker.

21. The method of claim 18, wherein the unit selector is configured to obtain a list of the candidate diphones from the database.

22. The method of claim 18, wherein the unit selector is configured to determine the quality of the label match by comparing consonant portions of the diphone with consonant portions of the candidate diphones, determining consonant distances between the consonant portions of the diphone and the consonant portions of the candidate diphones, assigning weights to the consonant distances, comparing vowel portions of the diphone and vowel portions of the candidate diphones, determining vowel distances between the vowel portions of the diphone and vowel portions of the candidate diphones, and assigning weights to the vowel distances.

23. The method of claim 18, wherein the unit selector is configured to determine the differences between the pitch contour of the diphone to pitch contours of the candidate diphones by calculating a first difference between a pitch at a beginning of the diphone and a pitch at an end of the diphone, calculating second differences between pitches at beginnings of the candidate diphones and pitches at ends of the candidate diphones, and comparing the first difference with the second differences to obtain a pitch contour between the diphone and the candidate diphones.

24. The method of claim 18, wherein the unit selector is configured to compare the differences between the duration of the diphone and the durations of the candidate diphones.

25. The method of claim 18, wherein the unit selector is configured to determine the differences between the plurality of formants of the preceding diphone that precedes the diphone and the corresponding pluralities of formants of the candidate diphones by normalizing the differences between the plurality of formants of the preceding diphone that precedes the diphone and the corresponding pluralities of formants of the candidate diphones.

26. The method of claim 25, wherein the plurality of formants comprises three formants of the at an end of the preceding diphone and the corresponding plurality of formants of the candidate diphones comprises a first three formants at beginnings of each of the candidate diphones.

27. The method of claim 18, wherein the unit selector is configure to determine the differences between the pitch of the diphone and the pitches of the candidate diphones by calculating differences between the pitch of the diphone at an end of the diphone and the pitches of the candidate diphones at beginnings of each of the candidate diphones.

28. The method of claim 18, wherein the unit selector is configured to compute weighted averages of the quality of the label match between the phonetic transcription of the diphone to the phonetic transcriptions of the candidate diphones, the differences between the pitch contour of the diphone to the pitch contours of the candidate diphones, the differences between the duration of the diphone and the durations of the candidate diphones, the differences between the plurality of formants of the preceding diphone that precedes the diphone and the corresponding pluralities of formants of the candidate diphones, and the differences between the pitch of the diphone and the pitches of the candidate diphones for each of the candidate diphones, and determine the best matching diphone based on the weighted averages.

29. The method of claim 28, wherein a weight of the quality of the label match between the phonetic transcription of the diphone to the phonetic transcriptions of the candidate diphones is 42%.

30. The method of claim 28, wherein a weight of the differences between the pitch contour of the diphone to the pitch contours of the candidate diphones is 25%.

31. The method of claim 28, wherein a weight of the differences between the pitch of the diphone and the pitches of the candidate diphones is 8%.

32. The method of claim 28, wherein a weight of the differences between the duration of the diphone and the durations of the candidate diphones is 17%.

33. The method of claim 28, wherein a weight of the differences between the plurality of formants of the preceding diphone that precedes the diphone and the corresponding pluralities of formants of the candidate diphones is 8%.

34. The method of claim 18, wherein the unit selector generates a string of best matching diphones for the sequence of diphones.

* * * * *